United States Patent
Teodorescu

(10) Patent No.: US 8,339,616 B2
(45) Date of Patent: Dec. 25, 2012

(54) METHOD AND APPARATUS FOR HIGH-SPEED UNCONSTRAINED THREE-DIMENSIONAL DIGITALIZATION

(75) Inventor: Nicolae Paul Teodorescu, Mission Viejo, CA (US)

(73) Assignee: Micrometric Vision Technologies, Mission Viejo, CA (US)

( * ) Notice: Subject to any disclaimer, the term of this patent is extended or adjusted under 35 U.S.C. 154(b) by 360 days.

(21) Appl. No.: 12/748,397

(22) Filed: Mar. 27, 2010

(65) Prior Publication Data

US 2010/0245851 A1    Sep. 30, 2010

Related U.S. Application Data

(60) Provisional application No. 61/165,077, filed on Mar. 31, 2009.

(51) Int. Cl.
*G01B 11/14* (2006.01)
(52) U.S. Cl. ........................................... 356/625
(58) Field of Classification Search .................. None
See application file for complete search history.

(56) References Cited

U.S. PATENT DOCUMENTS

| | | | |
|---|---|---|---|
| 4,802,759 A | 2/1989 | Matsumoto et al. | |
| 5,216,236 A | 6/1993 | Blais | |
| 5,589,942 A | 12/1996 | Gordon | |
| 5,708,498 A | 1/1998 | Rioux | |
| 5,946,645 A | 8/1999 | Rioux | |
| 6,510,244 B2 * | 1/2003 | Proesmans et al. | 382/203 |
| 6,542,249 B1 | 4/2003 | Kofman | |
| 6,549,288 B1 | 4/2003 | Migdal | |
| 6,754,370 B1 | 6/2004 | Hall-Holt | |
| 7,342,668 B2 | 3/2008 | Quadling | |
| 7,657,081 B2 | 2/2010 | Blais | |
| 7,876,455 B2 * | 1/2011 | Kawasaki et al. | 356/607 |
| 2008/0201101 A1 | 8/2008 | Hebert | |
| 2009/0059241 A1 | 3/2009 | Lapa | |

FOREIGN PATENT DOCUMENTS

WO    WO 93/03579    2/1993

* cited by examiner

*Primary Examiner* — Tu Nguyen

(57) ABSTRACT

A method and a system for optical three-dimensional (3-D) digitalization of physical objects, suitable for moving scenes, unattached to locating devices, utilizing structured light in the form of a plurality of overlapped patterns free of any intensity features, capable of obtaining frames of 3-D coordinates and textural color at video frame rates.

8 Claims, 3 Drawing Sheets

METHOD AND APPARATUS FOR HIGH-SPEED UNCONSTRAINED THREE-DIMENSIONAL DIGITALIZATION

PRIORITY

Priority is claimed to Provisional Application No. 61/165,077, filed on Mar. 31, 2009

DESCRIPTION

1. Field of Invention

The present invention relates to general field of three-dimensional (3-D) optical scanning of objects or scenes, and more particularly to obtaining frames of dense 3D measurements, at rates suitable for moving scenes and hand-held operations, and utilizing simple projection patterns.

2. Background of the Invention

A large number of techniques for obtaining relative distance (range) from imaging device to imaged object have been developed. The devices which obtain the measurements are known as range sensors or 3-D scanners. Range sensors are utilized to capture object shapes with the purpose to create digital representations of 3-D objects in the form of 3-D models, which are commonly used in increasing numbers of scientific and engineering activities. These include documenting artwork, artifact preservation, multimedia, interactive visualization, digitalization of complex parts, products customization, human body scanning, etc. . .

Many 3-D optical scanning principles have been devised, most notable being interference, time-of-flight, and optical triangulation. In general, their adequacy to a particular application is dictated by elements such as object size, depth of field, and distance from sensor to object.

Typically, range points are obtained in the form of 3-D profiles, and to obtain sufficient samples to describe the surface, the sensor head is rotated and translated relative to object surface. Resulting profiles are integrated in common reference frames to finalize a model of surface geometry. Traditionally this is achieved coupling the range sensor with positioning devices which supply position and orientation for the sensor. In many practical situations the locator range is insufficient requiring complex planning and careful data integration, which significantly increase operations complexity and cost, preventing digitalization of moving scenes.

A system suitable for moving scenes is capable of capturing substantial amounts of 3-D coordinates at video rates and, provided that motion doesn't produce blur in captured images, obtain 3-D models incrementally from successive frames. Such system should also be capable to ascertain textural color at each measured point, simultaneously with the 3-D coordinates. The system would also contain widely-available components, to promote simplicity, low-cost and broad accessibility.

The present invention relates to obtaining 3-D measurements by optical triangulation by structured lighting, utilizing multi-line pattern projections. In this technique, a radiation projector and an image sensor are configured to illuminate an object by a radiation pattern, consisting of a number of strips, and taking at least one image of the illuminated object. Range points are obtained by analyzing pixels in the captured frames to identify imaged strips, and triangulating range coordinates thereof.

The key element in multi-line projection systems is identification of pattern strips in the captured frames, to establish the correlation between projector and image frame points. To facilitate identification, many techniques are utilized. Some encode positional information in the projected pattern in a number of forms such as intensity features, time, or color.

One such technique, presented in U.S. patent application No. 2009/0059241 A1 (Lapa et al.), utilizes patterns containing intensity-coded elements, and employs projector-camera epipolar lines correspondence to locate elements positions and then recognize coded elements image frames. In order to work, coded elements have to be recognized unambiguously, which depends on a number of conditions, such as surface reflectivity, image resolution, and projector contrast ratio. Mitigating these factors may lead to either larger and therefore fewer coded elements, which in turn leads to fewer 3-D measurements, or specialized hardware components, which increase system cost and complexity. The technique is also error prone, particularly in textured and high contrast variance regions, because of reliance on intensity features, which restricts the type of suitable surfaces. Also, the technique does not have the ability to capture surface color at measured points.

Another technique is presented in U.S. Pat. No. 6,754,370 to Hall-Holt et al. (2004), allows 3-D measurements over a pair of frames, utilizing high-density intensity features, as black and white segments, in time-encoded sequences. Identification is achieved from matching segments boundaries in one frame to segments boundaries in previous frame The technique imposes surface reflectivity and continuity assumptions, to be able to detect segments boundaries and disambiguate depth. As such, is unable to operate in the presence of color variation or distinct surface features, and therefore, cannot detect any textural information in real-time.

U.S. Pat. No. 4,802,759 to Matsumoto et al. (1989), discloses a method where an object is illuminated by a grating pattern and where three-dimensional coordinates obtained by identifying one reference grating line including all its crossing points, and identifies other grating lines thereof by adjacency assumption (c.5 p.65 and c.6. p.50). However adjacency assumption is valid only on objects surface characterized by smooth geometry, and fails on general objects where grids lines appearance may break due to local features, leading to wrong strip identifications and therefore wrong measurements. Method disclosed in present invention has no restriction on object shape since strips identification is independent of detecting any other particular strip or particular intersection point set.

PCT document WO 93/03579 to Blake (1991), discloses a three-dimensional vision system comprising two projectors and one camera, where each projector illuminate a scene by a set mutually orthogonal lines. The method carries out epipolar identification of lines in one set and avoids ambiguities by setting limitations on the depth of filed of the system. According to the method disclosed in present invention both strip sets contribute measurements to frame coordinates, a single projector is utilized, and no restrictions are imposed on parallelism, periodicity or mutual angularity.

U.S. Pat. No. 6,542,249 to Kofman et al. (2003), discloses a method for three-dimensional objects digitization and modeling, where a limited number of parallel strips are projected onto objects, recording successive overlapping digital frames and calculating range frames by triangulation, where strip identification is carried out by scanning across digital frames and direct counting (claim 6-d, 8-d). The major shortcoming of the method is the requirement to have all projected strips visible in each digital frame in order to achieve identification. The method limits the type of suitable objects because imposes substantial smoothness constraints on object geometry, since local features may brake the appearance of strips and may not all be visible in each frame, which precludes identification by simple counting. Moreover, fitting overlapping surface patches requires a certain amount of three-dimensional features be present to enable mathematical convergence of alignments techniques mentioned in the reference, while samples in each frame are intrinsically limited by the inherently small number of strips, therefore introducing additional limitations to the class of objects for which the method may apply. Furthermore, the requirement to have all projected strips in the frame's field of view, imposes additional restrictions on operational depth of filed of the system.

As it will become apparent, the method of present invention carries out sampling from portions of projected strips and obtains frames of dense three-dimensional samples which facilitates robust alignment operations and therefore leads to fast and accurate objects digitalization.

The U.S. Pat. No. 7,342,668 B2 to Quadling et al. (2008), discloses a method for digitalization of dental items utilizing un-encoded, multi-line patterns. In this disclosure, surface digitization is achieved from a sequence of projections where in a first step, lines are identified by their order of in the image, and where subsequently added or shifted lines are estimated by proximity from previous frames.

The technique requires continuity assumption and cannot handle broken lines that may appear on more complex geometries. Also, it does not provide means for obtaining textural data.

Other identification techniques employ more complex illumination schemes and configurations including dedicated hardware components. One such system is presented in U.S. Pat. No. 6,549,288 B1 to Migdal et al. (2003), where color coded patterns are employed and multiple image frames are required to obtain 3-D measurements and color, inherently preventing operations in mobile scenes and range frames in real-time.

Other more complex techniques employ multi-camera configurations, and multi-frame strip matching, on the expense of increased complexity.

In addition to obtaining accurate measurements, realistic 3-D models may require capturing textural information. The inclusion of color in model data is commonly realized at a step where color shots of the model are taken from a number of vantage points, followed by a back-projection process, where color pixels are mapped to corresponding points on the model. One disadvantage of this procedure is that it requires compromise between color frame field-of-view and resolution, because color assignment to data points cannot be achieved on one-to-one relationship basis. Another disadvantage is that it requires additional frames capture, taken by an additional camera.

A system which obtains color data that uniquely correspond to each measurement, is described in U.S. Pat. No. 5,708,498 to Rioux (1998). The system employs polychromatic laser light having wavelengths corresponding to basic color components, to obtain 3-D profiles from the light reflected off the target's surface. The reflected light components pass through a splitter and are imaged on individual monochromatic cameras. The system outputs one 3-D color point profile at each camera frame, and requires external locators to assemble the profiles, before the model is obtained. As such, due to complexity and limitations, the system is unsuitable for moving scenes or hand-held operations.

Another color ranging technique is employed in the laser sensors manufactured by Micrometric Vision Technology, USA, where a range camera and a color camera form a one-to-one relationship between range coordinates and color intensities, to output one color 3-D profile each camera frame.

This technique is also deficient because of at least two cameras are required and because of the need for external locator to assemble 3-D frames.

Accordingly it is of great interest to provide simple and reliable range sensing techniques that can obtain frames of densely populated range coordinates and color, at video frame rates, suitable for mobile scenes and hand-held operations, comprising widely available, low-cost components.

SUMMARY OF THE INVENTION

It is an objective of the present invention to provide a method for high-speed digitalization, by employing simple projection patterns, free of coded elements or intensity features, identifying the patterns in image frames, and obtaining 3-D measurements by triangulation thereof in real-time.

It is a further objective of present invention to provide means for obtaining color information at each measurement point, simultaneously, in real-time.

It is still a further objective to provide a 3-D imaging system comprising at least a radiation projector, at least an image sensor and computing means, whereby range frames are calculated from projected patterns onto a scene, in real-time.

It is still further objective to provide a 3-D imaging system comprising at least a radiation projector, at least an image sensor and computing means, whereby points coordinate and color are obtained from projecting said patterns, in real-time. It is yet a further objective of present invention to provide a 3-D digitalization system suitable comprising inexpensive, widely-available components.

DESCRIPTION OF THE PREFERRED EMBODIMENTS

The method of the present invention is presented in the context of a system, providing means for digitalization of three-dimensional objects, by obtaining substantial amounts of accurate range coordinates, free of contact, in real-time, illuminating objects surface by multi-line patterns, identifying each pattern, and calculating point coordinates by triangulation.

Figure 1:
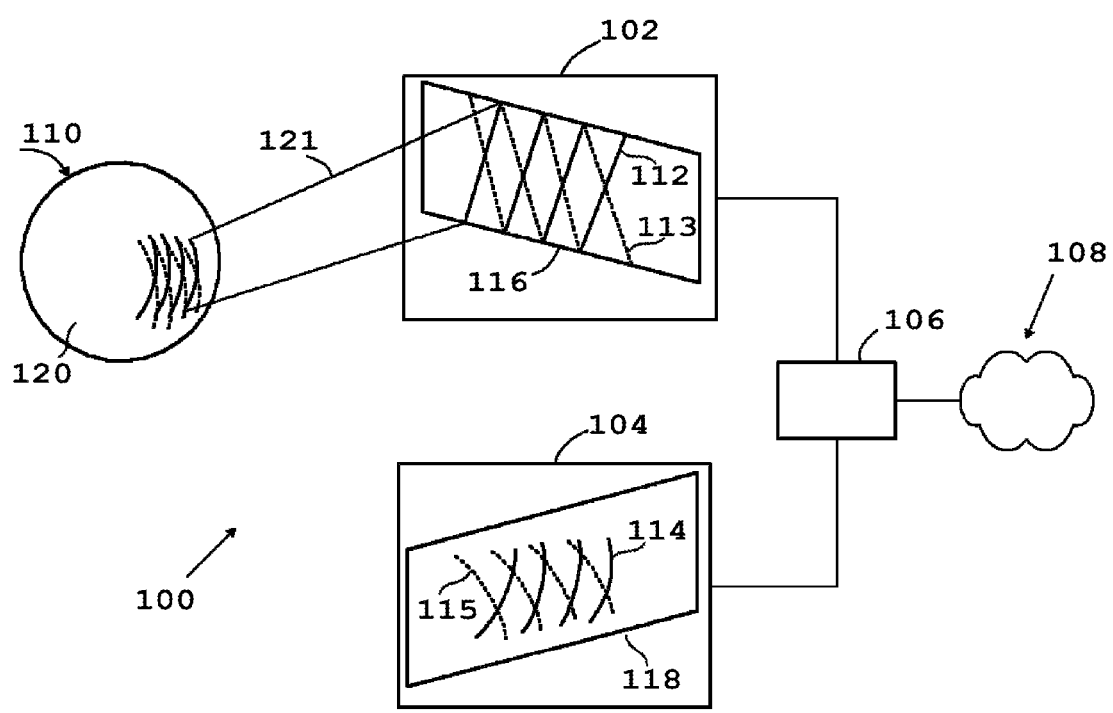
FIG. 1 is a schematic diagram of a high-speed digitalization system implementing present invention having a projector, illuminating an object by crossing patterns, fixed relative to an image sensor, capturing reflected projections, both in communication to a computer having an network connection.

FIG. 1 is a schematic representation of at least one embodiment of the system of the present invention. The digitizing system 100 consists of a radiation projector 102 and an image detector 104, both coupled to a computer 106. The image detector 104 is fixed relative to projector 102 and positioned at a measurable distance from image detector 104. Projector 102 and detector 104 have a measurable convergent orientation toward object 110.

Projector 102 radiates a set of patterns, 112 and 113, emanating from plane 116, where pattern strip projections are exemplary represented that solid sheet 121. Image detector 104 receives reflected radiation off surface 120 onto image plane 118, and records a digital snapshot of observed radiation pattern 114 and 115 respectively.

Projected patterns 112 and 113, consist of a plurality points, assembled such that they form mostly parallel strips, where points size and number can be finite or infinite. The sets of strips forming the two patterns have a measurable angular disparity, such that, when superimposed a on each other, a plurality of common locations occur defined by the intersection points. The patterns orientation is such that the triangulation disparity is large.

Any type of radiation with measurable intensity may be used in any embodiment of present invention. The preferred embodiments of this invention employ white or laser light projectors, and visible-spectrum image sensors, of CMOS (complementary metal oxide semiconductor) or CCD (charged coupled device) type.

Obtaining range frames at video rates can be sustained when computer 106 processes the image frames at the same speed they are received from the image sensor. Because computer 106 is not limited to any particular type, sustaining video rates depends on implementation details. At least in one embodiment, a distributed network 108, provide interconnection with a plurality of computing nodes, such as user computers, servers or mobile devices which can be utilized in parallel computation schemes.

In at least one embodiment, a pattern is formed at projector 102, combining patterns 112 and 113 on plane 116, in a single pixels array. The combined pattern is projected onto surface 120, and a frame thereof is captured at image sensor 104.

Figure 2A:
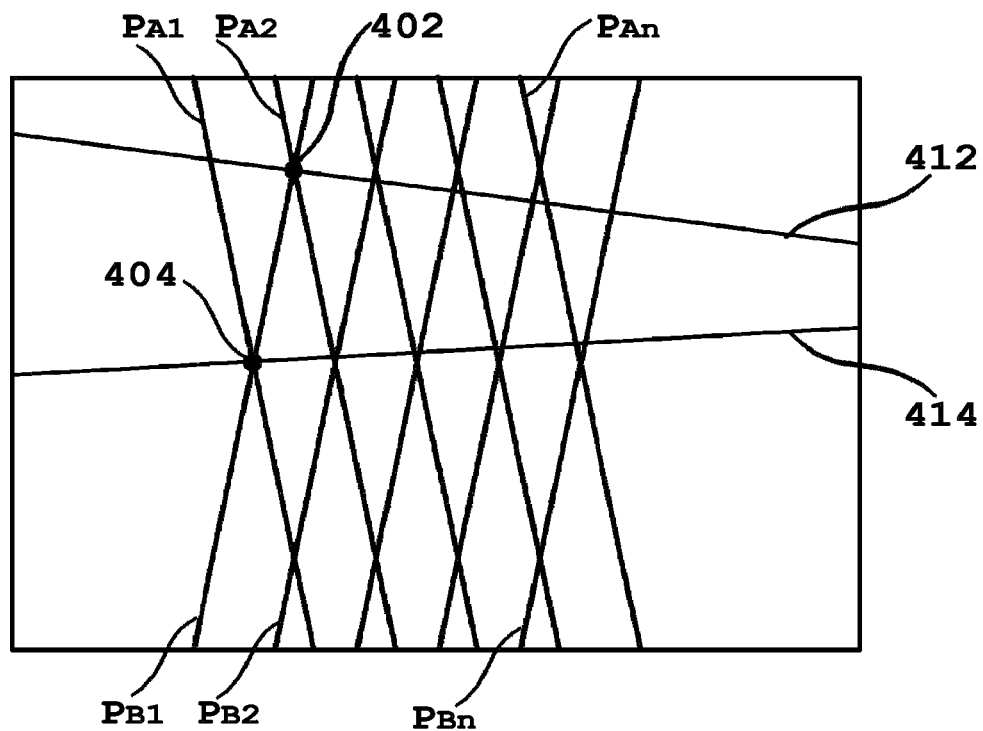
FIG. 2A illustrates the projected patterns at projector's pixel plane, having exemplary intersection points and epipolar lines

FIG. 2A illustrates the combined pattern where pattern 112 is represented by strips $P_{A1}$-$P_{An}$, and pattern 113 by strips $P_{B1}$-$P_{Bn}$.

Figure 2B:
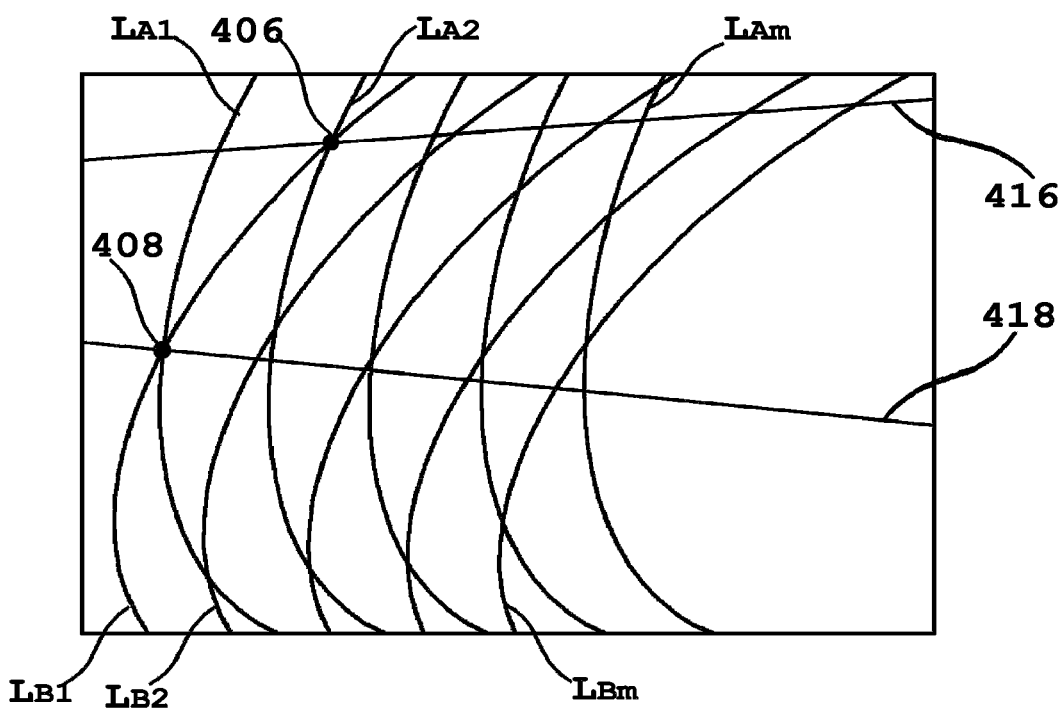
FIG. 2B illustrates approximate patterns captured at image sensor's plane having exemplary intersection points and epipolar lines

FIG. 2B illustrates reflected strips 114 and 115, represented by curvilinear segments $L_{A1}$-$L_{Am}$ and $L_{B1}$-$L_{Bm}$, respectively, and observed at image sensor 104.

Because the image sensor may capture a subset of the projected strips, the range of indices depicted in FIG. 2A and FIG. 2B is only exemplary.

The method of the present invention performs pattern identification of at least a subset of strips $\{P_{A1}, PA_2$ and $P_{An}\}$ and $\{P_{B1}, P_{B2}$ and $P_{Bn}\}$ from image frame strips $\{L_{A1}, L_{A2}$ and $L_{Am}\}$ and $\{L_{B1}, L_{B2}$ and $L_{Bm}\}$, employing epipolar relationship that exists between image plane 118 and projector plane 116, namely between commonalities defined by strips intersection points in the two planes. These intersection points in plane 116 and 118 will be referred to as projector and image nodal points, respectively. For example, image strip $L_{A2}$ intersects image strip $L_{B1}$ at nodal point 406.

At least in one embodiment, pattern strips 112, and 113 are linear segments, parallel to each other, equidistantly spaced, and configured such that each segment of a pattern is intersected at least twice by segments of other pattern. For example, strip $P_{B1}$ of pattern 113 is intersected by strips $P_{A1}$ at nodal point 402, and by strip $P_{A2}$ of pattern 112, at nodal point 404.

In one aspect of epipolar relationship, for each point in plane 116 defines a corresponding line in plane 118, and for point in plane 118 defines a corresponding line in plane 116.

The epipolar relationship can be expressed by matrix product:

$$I = F * x, \quad (1)$$

where x is a 3-vector point coordinate in projector plane, I is a 3-vector defining epipolar line in image plane, and F obtained at a calibration step. Calibration techniques have been widely publicized in technical literature, and known in the art. By way of explanation, the line I can be thought of as the image of a ray emanating at the point x in the projector plane. For example, lines 416 and 418 are conceptual representations of epipolar lines corresponding to projector nodal points 402 and 404, respectively, and are not part of the pattern. Similarly, lines 412 and 414 are conceptual representations lines corresponding to image nodal points 406 and 408 respectively, and are not part of the image frame.

In another aspect of epipolar relationship, epipolar lines in each plane, intersect at a common point, referred to as epipole. Because the projector and image sensor are configured under a convergent angle, projector and image sensor epipoles can be calculated from calibration matrices. Accordingly, a unique nodal point correspondence can be established from underlying epipolar relationship of the two planes.

At least in one embodiment, strip identification is performed in tree steps, as following.

In the first step, each image nodal points (e.g. 406, 408), is located with sub-pixel accuracy, by analyzing the image frame and applying standard image processing techniques. Locating nodal points can be sped up by constraining the search along epipolar lines corresponding to projector nodal points, e.g. 416, 418. These lines can be calculated at a startup step, because the geometry of projected patterns 112, 113, is known in advance.

In the second step, nodal correspondence is established, such that each image nodal point corresponds to one projector nodal point. This is achieved by calculating nodal point's distance to each epipolar line, and setting a correspondence with the point associated with closest one.

In the third step, strips $L_{A1}$-$L_{An}$ and $L_{B1}$-$L_{Bn}$, are disambiguated and labeled, by analyzing pixels connectivity. Disambiguation is quickly carried out setting a one-to-one relationship between pattern segments and distinguishable image segments, e.g. segment 402-404 corresponds to segment 406-408. Finally, the pixels of disambiguated segments are labeled based on originating pattern strips, $P_{A1}$-$P_{An}$ and $P_{B1}$-$P_{Bn}$.

A number of pattern parameters affect identification and this condition can be achieved by adjusting the number of strips and angular orientation in each pattern. One condition to obtain distinguishable segments is that each individual strip of the first and the second pattern must intersect at least twice. No assumptions on individual strips geometry are made and identification can perform as long as pattern strips are not self-intersecting and enable sufficient discrimination of epipolar lines. In the preferred embodiments of the invention, the strips are rectilinear, parallel and equidistant.

Discrimination between the epipolar lines is necessary to ensure correct point-line matching when nodal correspondence is determined. This condition is easily satisfied because epipolar lines in the projector plane can be calculated, at a setup step, utilizing epipole's coordinates, where the distance between each line and nodal points can be compared against a preset tolerance, and can be compensated by adjusting pattern parameters. Each stripe $L_{A1}$-$L_{An}$ and $L_{B1}$-$L_{Bn}$ may have a cross-sectional intensity characterized an intensity function. The cross-sectional function may have a Gaussian profile or any other function, characterized by an apex that can be calculated with sub-pixel precision. The apex is triangulated and point coordinates calculated thereof.

A remarkable advantage of the method is the ability to obtain substantially large numbers of 3-D coordinates from one image frame, because both patterns contribute to surface sampling. Patterns configuration can be chosen to maximize number of measurements, such that reflected strips remain distinguishable in the image frames. The large number of pattern variations is within the scope of present invention.

In an embodiment, surface 120 is illuminated by pattern 112 and pattern 113 sequentially, and a first and a second image frame captured thereof, in a two-shot cycle. The first and the second image are captured at short time intervals such that object 110 appears stationary with respect to image sensor 104. In case of stationary scenes, the time interval between frames capture is unimportant as long as images are captured successively.

Further, strips identification is performed, in a first step of locating nodal points quickly in the individual frames, and a second step of establishing nodal correspondences and labeling connected pixels.

In the first step, the image frames can be searched in parallel and nodal coordinates are located by local maxima intensity coincidence, which can be obtained with sub-pixel accuracy. Pixels of both image frames which correspond to nodal points, are labeled for latter retrieval.

In the second step, the one-to-one correspondence between image and projector nodal points is established by epipolar constraint described earlier, thereby establishing direct relationship between strips, and connected pixels are labeled accordingly. Further, intensity apexes can be located from the intensity profiles with sub-pixel accuracy, and 3-D measurements triangulated thereof.

One advantage of the two-shot technique is that strips can be identified when at least one nodal point is located on distinguishable segments. As such, two intersecting strips can be identified from one correspondence only.

Another advantage of the two-shot technique is that it takes fewer steps to complete, because nodal points can be obtained by traversing the image frames once, avoiding image frame analysis step in one-step technique.

The two-shot technique has the ability to obtain substantially large numbers of point coordinates, because both image frames contribute to surface sampling.

In the two-shot technique a range frame can be obtained in 2/N time interval, where N is the number of frames per second characterizing the image sensor. With capture rates of 60 Hz, range frames can be obtained 0.033 seconds apart, suitable for a large number of moving scenes.

The number of 3-D measurements can be maximized when pattern parameters are set to optimize strips density and distinguishability.

Figure 3:
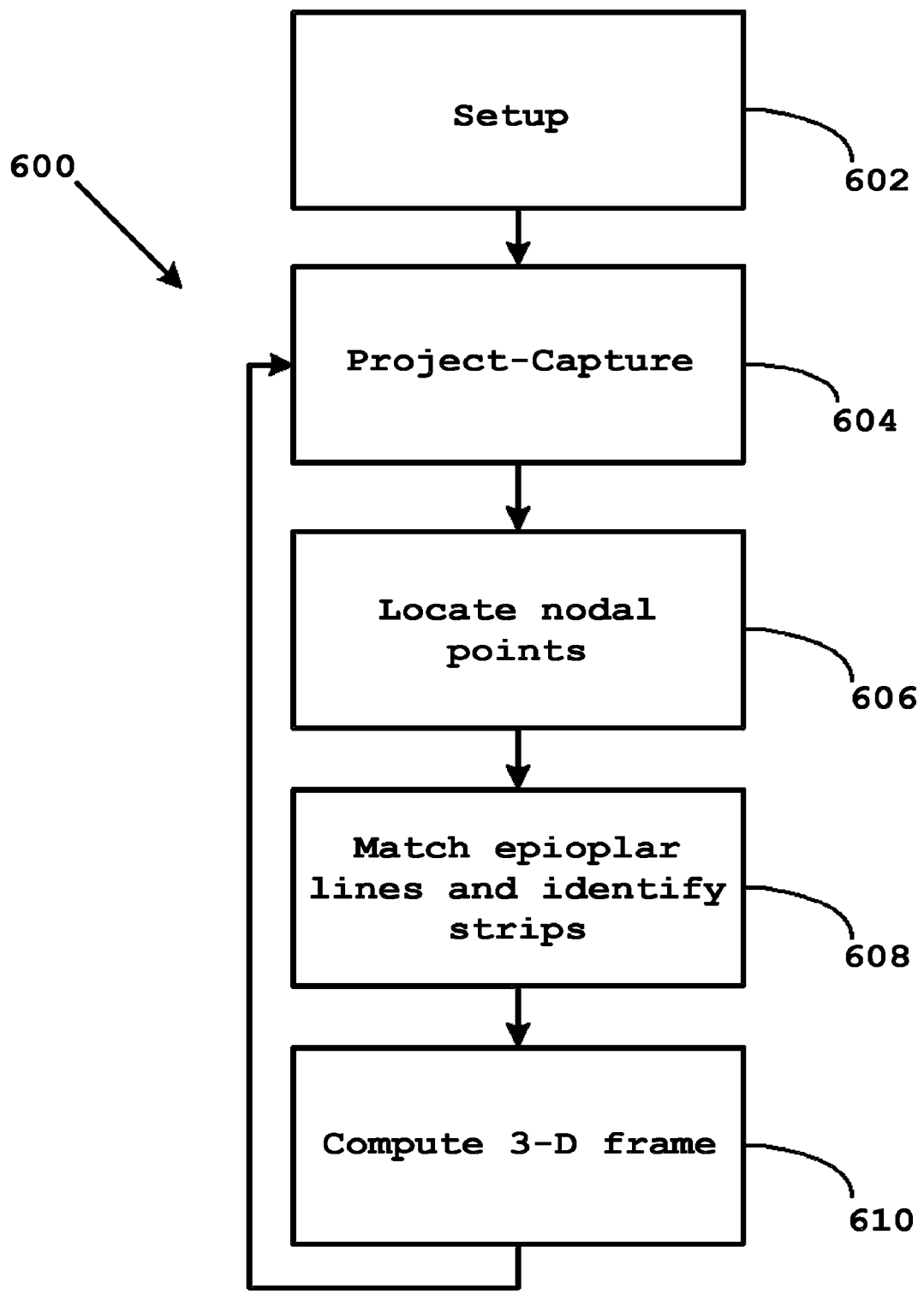
FIG. 3 is a flow diagram of digitalization method

The conceptual flow 600 of the present invention is shown in FIG. 3. In general, individual steps are not necessarily preformed in the precise order shown. Furthermore, different computational steps of the method can be preformed on a plurality of interconnected computers, to optimize the efficiency of the method.

In step 602, a number of parameters are obtained and stored in digital format. The numeric representation of light sheets 121, characterizing projection of each pattern strip in 3D space is derived from calibration matrices, obtained at a calibration step, not included. Epipolar lines digital description is obtained and memorized conveniently to reflect respective pattern strips identity. Epipoles' coordinates may be calculated, such that patterns validity checks can be conducted. Also, one-shot or two-shot identification strategy may be chosen.

In step 604, projector and image sensor operate under computer control, executing project-capture cycle accordingly.

In step 606, nodal points are located with sub-pixel accuracy, executing the appropriate technique for chosen strategy. This step can be implemented to execute in parallel with step 604, which may be capturing subsequent sets of frames.

In step 608, strips identification is carried out accordingly. At this step, epipolar lines calculated at step 602 are matched against the nodal points identified at step 606 to establish nodal correspondence, and execute labeling and disambiguation.

In step 610, 3-D point measurements are triangulated by executing calculation steps for intensity profile apexes coordinates and range coordinates, utilizing the numeric representation of sheets calculated at step 602.

An important application of the method is digitalization of objects when objects and sensor move relative to each other, with the purpose of exposing portions of the surface to the range sensor, such that 3-D model of the object are obtained quickly.

This is possible because the large number of samples collected in a single range frame and, when gathered continuously, successive range frames are very close together. The successive frames can be aligned to one another, by means available in the art. One such mean is iterated closest point (ICP) algorithm. ICP aligns two sets of 3-D data and, to succeed, the algorithm requires an initial estimate of position and orientation. The relative position of the two sets is modified iteratively until convergence is achieved.

Because the proximity of the successive frames obtained by way of the present invention, alignment can complete in few iterations.

Objects characterized by weak geometry may adversely impact align results, because a unique matching solution may not exits. As such, when digitizing areas of relatively uniform shape incorrect 3-D models may result. This issue can be addressed by utilizing artifacts which incorporate intensity or textural features in the matching process, such as affixed landmarks. As it will become apparent, the present invention provides for a step where positional features can be located from underlying intensity information.

It is another objective of present invention to provide means to ascertain surface color data for each point in the measurement frame.

In the preferred embodiments, image sensor 104 is a camera of color type, which records intensities of red, green and blues (RGB) at each pixel, in digital format. The projector 102 is a color laser projector, which utilizes a plurality of plurality laser sources to emanate color images, where each laser source is characterized by a wavelength. By projecting the color laser beam onto a surface point, the content of color intensities contained in the returned light is proportional to surface color at the illuminated point.

In an embodiment, the object is illuminated with white laser light patterns, such that projected onto a surface, the light contains equal amounts of red, green and blue, and a snapshot is taken thereof. Each color component contained in the reflected light is digitized by camera pixels and an intensity values is assigned for each component.

At a calibration step, at least a step of mapping camera spectral response to projected wavelengths can be performed, with the purpose of achieving color intensities adjustment based on desired conformity criteria.

Laser projectors are widely available, low-cost consumer products, which utilize mature technologies such as MEMS (micro electro-mechanical systems) and LCoS (liquid crystal on silicon). They have a number of advantages over regular white-light projectors, such as increased intensity, availability in multiple wavelengths, focus-free operation, reduced size, low power consumption and low heat dissipation. Projection frequencies are generally at 60 Hz or higher, which is suitable for video frame rates sustainability, enabling digitalization of shape and color in moving scenes presented in this invention.

To include color intensities in range measurements, a step is provided where the color frames are cached, before monochrome versions are obtained thereof. The monochrome frames are utilized in point coordinates calculation, and for each 3-D point, the color intensities at respective pixel are included in the measurement.

In an embodiment, the camera is of monochrome type, the point coordinates are associated with gray-scale intensity values obtained from the captured pixel arrays.

Color or monochrome intensity data can help locate artifacts on object surface, such as landmarks, affixed on object's surface, with the purpose of assisting in the alignment process. Landmark locations can be pinpointed by standard image processing techniques. By way of example, observing intensity transitions occurring in connected pixels of strips, a dark circular landmark can be localized by estimating its contour from at least three intensity transition points corresponding to landmark's border. Landmark-aided align techniques are covered in technical literature and are known in the art.

The method of the present invention has a number of significant advantages over prior art:
 (a) Simple projection patterns, free of codes or features.
 (b) Substantially larger number of 3-D samples at video frame rates.
 (c) Ascertains textural data directly from underlying image frame, for each measurement point.

The method of the present invention has been described in the context of preferred embodiments of a digitalization system. Many modifications, variations, and improvements may occur to skilled in the art. For example, more than one camera may be configured, to improve visibility in the presence of complex geometries, or to provide for digitizing various levels of detail. Also, a number of pattern and color combinations can be conceived to address specific applications. Such modifications, variations and improvements, following, in general, the principles of the invention, fall within true spirit and scope of the disclosure and are covered by the present invention.

A large array of applications can benefit from the advantages of present invention, where large amounts of close-range, non-contact measurements and color are required. These applications include, but not limited to, medical, cultural, scientific, and industrial fields. Because the method provides for digitalization at video frame speed and the system can be configured utilizing low-cost components, it is suitable for consumer markets in a variety of formats.

What is claimed is:

1. A method of obtaining three-dimensional coordinates of physical objects comprising steps of:
 (a) illuminating an object by radiation patterns emanating from a projector frame, having a plurality of strips, each said strip having predetermined position and orientation, having at least some of said strips intersecting each other at nodal points;
 (b) recording in a digital frame at least a portion of said strips and said nodal points reflected by said illuminated object, in the form of intersecting profiles of illuminated pixels in said digital frame corresponding to said portion of said strips and said nodal points;
 (c) locating said nodal points and said profiles pixel coordinates in said digital frame;
 (d) determining nodal points in said projector frame corresponding to said nodal points in said portion of said strips and said nodal points in said digital frame;
 (e) identifying strip pixels from each said nodal point in said digital frame and at each said corresponding nodal point in said projector frame;
 (f) calculating three-dimensional measurements corresponding to said profiles in said digital frame by triangulating said profiles pixels and said projected strips in a local frame of coordinates.

2. The method of claim 1 wherein said object is illuminated by two successive patterns of strips, wherein at least a portion of each said patterns of strips reflected by said object is recorded in two successive digital frames taken at identical viewpoints and orientations, wherein nodal points formed by superimposing said two successive patterns of strips and said two successive digital frames, are utilized to identify at least a portion of said superimposed said two successive patterns of strips and said two successive digital frames.

3. The method of claim 2 further including creating the three-dimensional model of said object by aligning at least partially overlapping said local fames of coordinates containing measurements corresponding to said portion of crossing profiles into a common frame of coordinates.

4. The method of claim 1, further including ascertaining color information of object' surface simultaneously with said three-dimensional coordinates, wherein said radiation patterns has a plurality of predetermined wavelengths, wherein said image sensor is sensitive to at least some of said radiation wavelengths, wherein digital frame pixels intensities are proportional to each of said some radiation wavelengths, wherein color intensities are assigned to said profile pixels, wherein said color intensities are associated to said three-dimensional coordinates.

5. A digitalization system comprising:
 (a) means for illuminating an object by radiation patterns emanating from a projector frame, having a plurality of strips, each said strip having predetermined position and orientation, having at least some of said strips intersecting to each other at nodal points;
 (b) at least an image sensor configured to record at least a portion of said strips and said nodal points reflected by said illuminated object, in the form of intersecting profiles of illuminated pixels in said digital frame corresponding to some of said intersecting strips;
 (c) computing means configured for:
  (i) locating said nodal points pixel coordinates of said intersecting profiles in said digital frame;
  (ii) determining nodal points in said projector frame corresponding to said nodal points in said portion of said strips and said nodal points in said digital frame;
  (iii) identifying strip pixels at each said nodal point in said digital frame at each said corresponding nodal point in said projector frame;
  (iv) calculating three-dimensional coordinates corresponding to said profiles in said digital frame by triangulating said profile pixels and said projected strips in a local frame.

6. The digitalization system of claim 5 further including creating the three-dimensional model of said object by aligning at least partially overlapping said local fames coordinates containing measurements corresponding to said portion of crossing profiles into a common frame of coordinates.

7. The digitalization system of claim 5 wherein said object is illuminated by two successive patterns of strips, wherein at least a portion of each said patterns of strips reflected by said object is recorded in two successive digital frames taken at identical viewpoints and orientations, wherein nodal points formed by superimposing said two successive patterns of strips and said two successive digital frames, are utilized to identify at least a portion of said superimposed said two successive patterns of strips and said two successive digital frames.

8. The digitalization system of claim 5, further including ascertaining color information of object' surface simultaneously with said three-dimensional coordinates, wherein said radiation patterns has a plurality of predetermined wavelengths, wherein said image sensor is sensitive to at least some of said radiation wavelengths, wherein digital frame pixels intensities are proportional to each of said some radiation wavelengths, wherein color intensities are assigned to said profile pixels, wherein said color intensities are associated to said three-dimensional coordinates.

* * * * *